US012766789B2

(12) United States Patent
Maccagnan

(10) Patent No.: US 12,766,789 B2
(45) Date of Patent: Oct. 20, 2026

(54) DEPOSITION PLANE FOR ADDITIVE MANUFACTURING PROCESSES

(71) Applicant: EXGINEERING SA, Manno (CH)

(72) Inventor: Simone Maccagnan, Castronno (IT)

(73) Assignee: EXGINEERING SA, Manno (CH)

( * ) Notice: Subject to any disclaimer, the term of this patent is extended or adjusted under 35 U.S.C. 154(b) by 170 days.

(21) Appl. No.: 18/726,465

(22) PCT Filed: Jan. 17, 2022

(86) PCT No.: PCT/IB2022/050346
§ 371 (c)(1),
(2) Date: Jul. 3, 2024

(87) PCT Pub. No.: WO2023/135450
PCT Pub. Date: Jul. 20, 2023

(65) Prior Publication Data

US 2025/0065564 A1 Feb. 27, 2025

(51) Int. Cl.

*B29C 64/245* (2017.01)
*B29C 64/232* (2017.01)
*B29C 64/393* (2017.01)
*B33Y 30/00* (2015.01)
*B33Y 50/02* (2015.01)

(52) U.S. Cl.
CPC .......... *B29C 64/245* (2017.08); *B29C 64/232* (2017.08); *B29C 64/393* (2017.08); *B33Y 30/00* (2014.12); *B33Y 50/02* (2014.12)

(58) Field of Classification Search
CPC .... B29C 64/245; B29C 64/295; B29C 64/264
See application file for complete search history.

(56) References Cited

U.S. PATENT DOCUMENTS 4,621,995 A * 11/1986 Wersosky ............. B29C 33/046 425/185
6,484,776 B1 * 11/2002 Meilunas ................ B32B 37/00 156/581
2010/0100222 A1 4/2010 Skubic et al.
2016/0325501 A1 * 11/2016 Ready .................... G05B 15/02
(Continued)

FOREIGN PATENT DOCUMENTS

CN 105711095 B * 9/2017 ............. B33Y 30/00

OTHER PUBLICATIONS

English translation of Shen (CN105711095B), (2026). (Year: 2026).*
(Continued)

*Primary Examiner* — Matthew J Daniels
(74) *Attorney, Agent, or Firm* — Chrisman Gallo Tochtrop LLC

(57) ABSTRACT

A deposition plane for additive manufacturing processes comprises a work surface (2) and a handling device. The work surface (2) is topologically deformable in at least one deformation zone and has a first face (2*a*) on which an object can be formed. The handling device comprises at least one actuator (3) coupled to a second face (2*b*) of the work surface (2) at the at least one deformation zone. Such a handling device is configured to locally deform the work surface (2) by moving the deformation zone thereof, preferably by exerting a pulling or pushing action on said deformation zone by means of the actuator (3).

9 Claims, 2 Drawing Sheets

(56) References Cited

U.S. PATENT DOCUMENTS

| | | | | |
|---|---|---|---|---|
| 2017/0087769 | A1* | 3/2017 | Lancaster-Larocque | .................... B33Y 30/00 |
| 2019/0176393 | A1 | 6/2019 | Broady et al. | |

OTHER PUBLICATIONS

International Search Report and Written Report issued in PCT/IB2022/050346 on Sep. 8, 2022, 11 pages.

* cited by examiner

DEPOSITION PLANE FOR ADDITIVE MANUFACTURING PROCESSES

TECHNICAL FIELD

The present invention relates to the technical field of devices and equipment for performing additive manufacturing processes.

In particular, the present invention relates to a deposition plane on which it is possible to form an object, even a large one.

BACKGROUND ART

One of the biggest and most significant challenges in the field of additive manufacturing is currently the manufacture of large objects.

To this regard, it is known from US2010/100222 a platform assembly for use in a digital manufacturing system, where the platform assembly comprises a deformable platform having a surface configured to operably receive a deposited material from a deposition head, and at least one mechanism configured to adjust at least a portion of the first surface to compensate for at least one vertical deviation from at least one horizontal axis that the deposition head is directed to move in.

It is also known from US2019/176393 an additive fabrication device and a build platform suitable for use within an additive fabrication device are provided. The build platform may include a build surface on which material may be formed by the additive fabrication device when the build platform is installed within the additive fabrication device. According to some embodiments, the build platform may include a flexible build layer and at least one removal mechanism configured to be actuated to apply a force to the flexible build layer. Such actuation may cause the flexible build layer to deform, thereby enabling separation of material adhered to the build surface from the build platform. According to some embodiments, the build platform may comprise a restorative mechanism that acts to return the flexible build layer to a flat state so that subsequent additive fabrication may form material on a flat build surface.

In fact, additive manufacturing technology allows to easily make objects of a fairly limited size and simple structure, but if large or even structurally complex objects are to be produced, problems arise for which adequate solutions have not yet been made available in the prior art.

In particular, one of the major problems inevitably derives from the intrinsic features of the materials, which are usually polymer-based and fed to a plant for additive manufacturing in a solid and discrete form.

Inside the plant, such materials are heated and brought into a state in which it is possible to extrude them through a suitable nozzle which follows the trajectory necessary to sequentially create superimposed and successive planes of the object to be manufactured.

During the cooling of the material, or following its extrusion, its natural tendency to shrink occurs, which causes tension stresses within the layers themselves and also between the various layers which overall define the object.

For objects of limited size, such tension stresses can in principle be considered minor and usually insufficient to have a significant impact on the mechanical features of the object.

On the contrary, when large objects are manufactured, the shrinkage of the material is such as to generate tension stresses sufficient to at least deform the structure manufactured, possibly even reaching the formation of real breakpoints.

Therefore, there is a strong need in the field to develop new solutions capable of in particular overcoming the above problem, thereby making it possible to produce, by means of additive manufacturing processes, high-quality and structurally solid objects regardless of their size.

OBJECT OF THE INVENTION

In this context, the technical task underlying the present invention is therefore to propose a deposition plane which overcomes at least some of the drawbacks of the known art mentioned above.

In particular, it is an object of the present invention to provide a deposition plane on which a wide range of moulding architectures can be made, obtaining optimal results regardless of the size of the object to be produced.

The technical task mentioned and the objects stated are substantially achieved by a deposition plane comprising the technical features set out in one or more of the appended claims.

According to the present invention, a deposition plane for additive manufacturing processes is shown.

The plane comprises a work surface on which an object can be made and a handling device.

The work surface is topologically deformable in at least one deformation zone.

The handling device comprises at least one actuator coupled to the work surface at the at least one deformation zone and is configured to deform it locally.

In particular, the handling device is configured to move the deformation zone, preferably exerting a pulling or pushing action thereon by means of the actuator.

Advantageously, such a work surface can be deformed as a function of the specific structural as well as mechanical features of the object to be made and of the material which will compose it, thereby allowing to adapt the shape of the deposition plane to gradually and progressively follow any shrinkage of the material, thus reducing the mechanical stress to which it is subjected to a minimum.

The dependent claims, included here for reference, correspond to different embodiments of the invention.

BRIEF DESCRIPTION OF THE DRAWINGS

Further features and advantages of the present invention will become more apparent from the description of an exemplary, but not exclusive, and therefore non-limiting preferred embodiment of a deposition plane, as illustrated in the appended drawings, in which.

DETAILED DESCRIPTION OF PREFERRED EMBODIMENTS OF THE INVENTION

Figure 1:
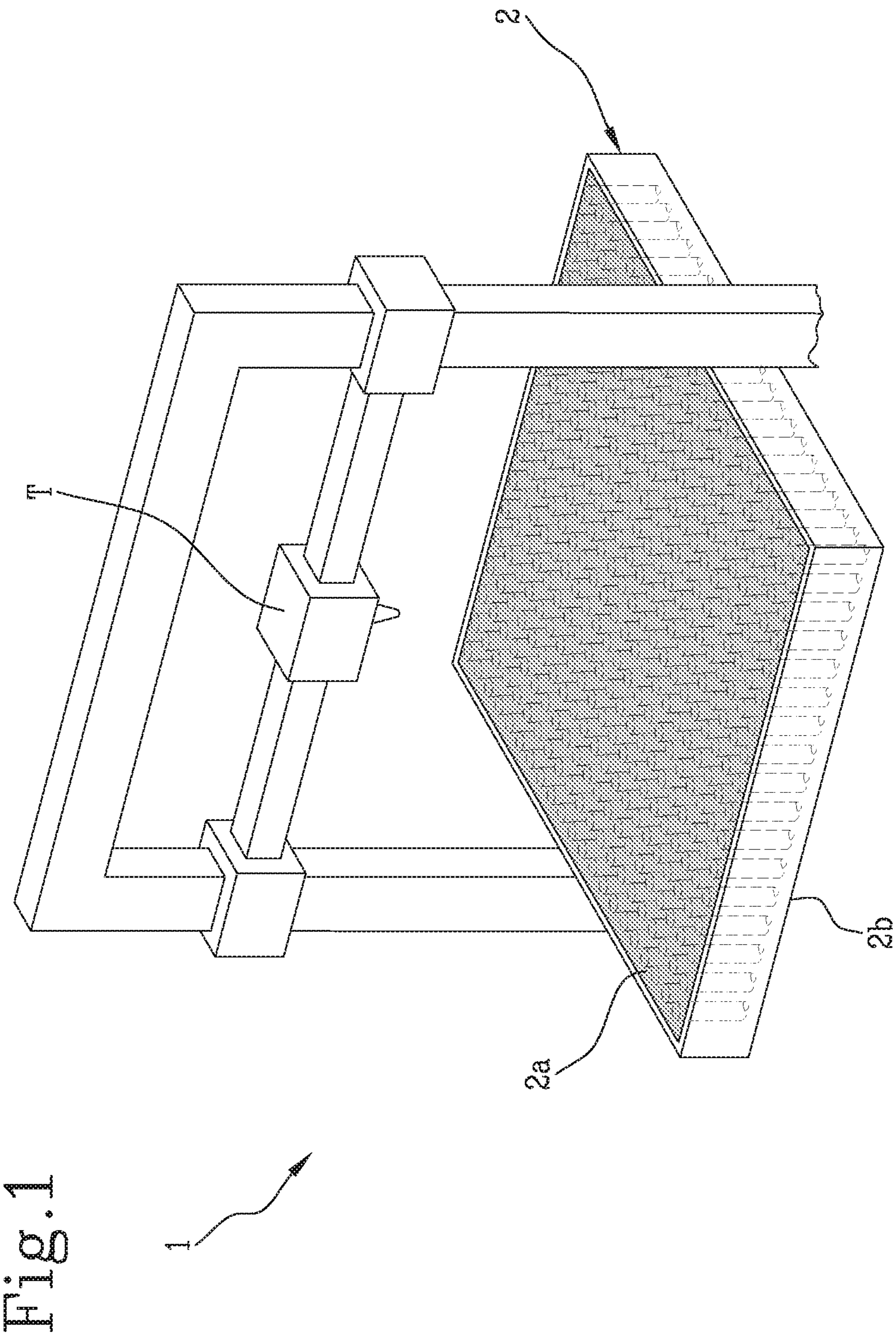
FIG. 1 shows a view of the plane according to the present invention.
Figure 2A:
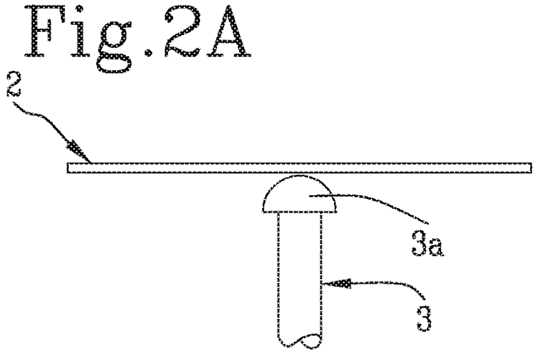
FIGS. 2A-2B show a first possible embodiment for the plane in which there is a deformation zone.
Figure 2B:
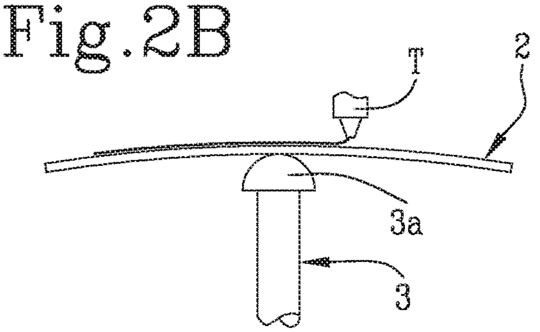
Figure 3A:
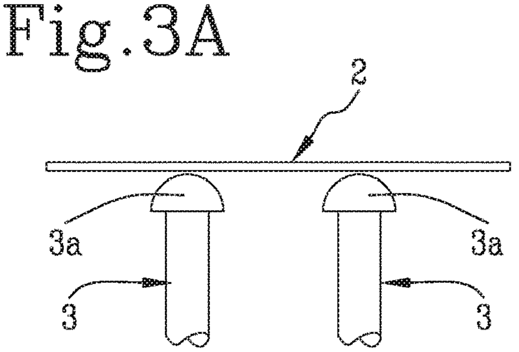
FIGS. 3A-3B and 4A-4B show further possible embodiments for the plane object of the present invention in which a plurality of deformation zones is present.
Figure 3B:
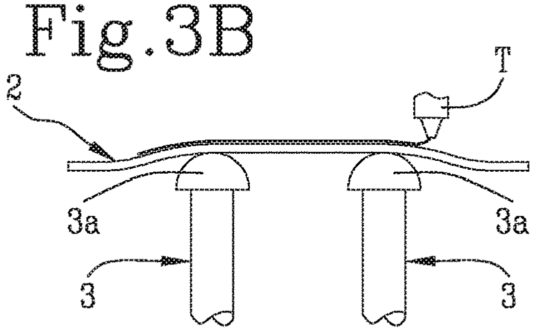
Figure 4A:
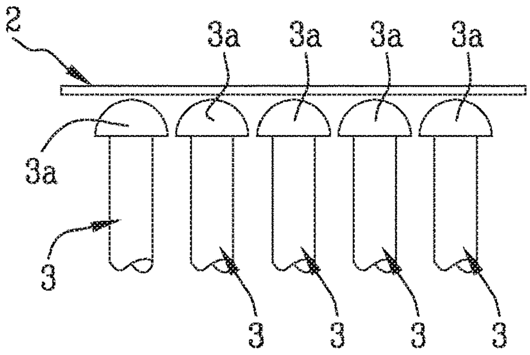
Figure 4B:
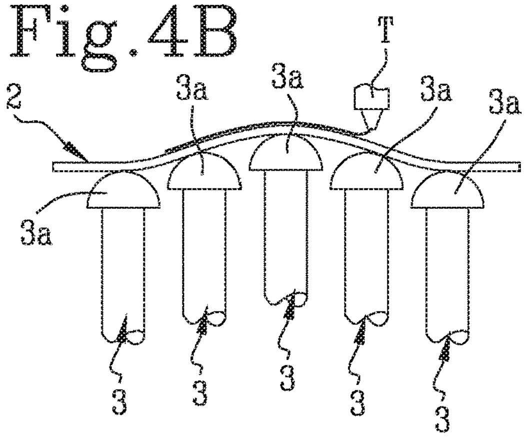
Figure 5A:
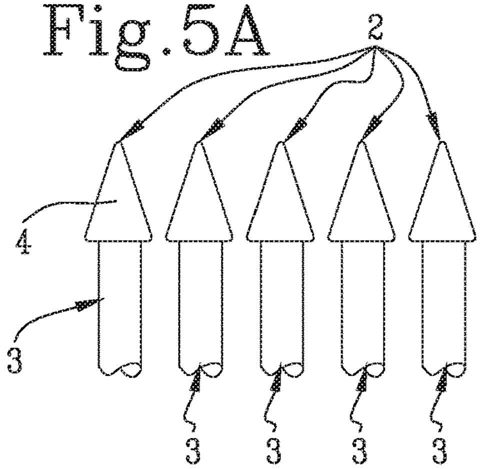
FIGS. 5A-5B show a further possible embodiment for the plane object of the present invention in which the entire surface is defined by adjacent deformation zones.
Figure 5B:
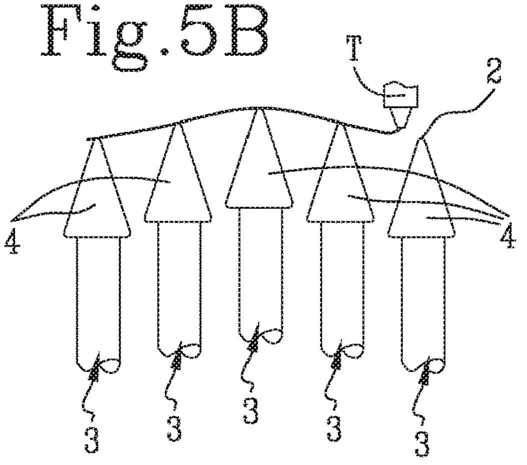

In the appended drawings the reference numeral 1 generally indicates a deposition plane for additive manufacturing processes, which is referred to in the following description simply as plane 1.

Structurally, the plane comprises a work surface 2 having a first face 2*a* on which an object can be formed.

In other words, the first face 2*a* defines a base on which a material can be progressively deposited during an additive manufacturing process for making an object.

Advantageously, the work surface 2 is topologically deformable in at least one deformation zone, i.e., the work surface 2 has a morphology which can be varied in one or more points.

Such a variation can be modulated during the execution of the additive manufacturing process so as to make the overall shape of the first face 2*a* more dynamic both during the deposition of the material and after the execution of such an operation.

Operationally, when the material is deposited it can have intrinsic features, especially from a physical point of view, which will vary over time.

For example, consider the properties of a material which is extruded and which can be influenced by the temperature of the material and therefore subject to variation as the material cools after being extruded.

Such cooling causes a progressive shrinkage of the material such as to generate an active tensile stress on all the layers defining the object being made and which can cause its substantial curvature or even breakage.

In fact, in shrinking, each layer exerts a force on the underlying layer and therefore the forces involved are summed with one another, being maximum for the upper layer of the object and sufficient to cause a substantial deformation of the object itself.

In such a context the work surface 2 can be previously deformed to assume a curved configuration having a curvature opposite to that which the object to be made would undergo and which is progressively relaxed during the execution of the additive manufacturing process to gradually accompany the deformation of the object itself.

Thereby, the deposition of the material occurs according to an overall curved geometry such as to smooth out in response to the natural shrinkage of the material during its cooling.

Operationally, therefore, the work surface 2 does not have a planar shape when the material is extruded thereon, but has a curved and variable trend so as to allow it to accompany the conformational variations of the layer deposited thereon.

Preferably, the first face 2*a* also has a corrugated shape which reduces the contact surface between the first face 2*a* and the object, in particular between the first face 2*a* and the first layer of the object being made.

Such a feature makes it possible to reduce the adhesion between the first face 2*a* and the object, facilitating both the separation of the object from the plane 1 at the end of its manufacture and any sliding of the first layer of the object with respect to the first face 2*a* due to the shrinkage of the material during its cooling, thus avoiding the occurrence of excessive tensile stresses, which could lead to the formation of breakpoints, between the first face 2*a* and the object.

The deformation of the plane 1 is carried out by means of a handling device, which comprises at least one actuator 3 coupled to a second face 2*b* of the work surface 2 at the at least one deformation zone.

The actuator 3 is configured to locally deform the work surface 2 by moving the deformation zone.

In other words, the handling device comprises at least one actuator 3 which mechanically interacts with the work surface 2 by acting on its deformation zone, preferably exerting a pulling or pushing action thereon.

Therefore, in accordance with a preferential aspect of the present invention, the at least one actuator 3 can comprise a linear-type actuator 3 coupled to the work surface 2 at the deformation zone and operable in motion to exert a thrust or a traction on the deformation zone.

Operationally, the thrust of the actuator 3 generates a progressive lifting of the deformation zone while the traction determines its lowering, going in both situations to overall bend at least the portion of work surface 2 adjacent to the deformation zone and preferably causing the overall curvature of the entire work surface 2.

In this context the work surface 2 can be obtained by a single plate-shaped element in elastically deformable material, for example a plastic material, which changes its shape when subjected to a pushing or pulling action by the actuator 3.

In accordance with a possible embodiment, the actuator 3 is a linear actuator 3 which can have a movable head 3*a* adapted to engage the second face 2*b*.

In particular, the movable head 3*a* can have a more or less extended engagement portion which is abutted against the second face 2*b* at the deformation zone.

Advantageously, the movable head 3*a* can have a curved profile, for example a hemisphere, so that during a pushing action with which the deformation zone is raised the work surface 2 can gradually wrap around the movable head 3*a* without the risk of breakage and damage.

In accordance with a further possible embodiment, the actuator 3 is made by means of or comprises bimetallic sheets bendable by the application/subtraction of heat.

In accordance with a further possible embodiment, the actuator 3 can comprise piezoelectric actuators 3.

Advantageously, depending on production needs, or depending on the geometrical and structural features of the object to be made, it is possible to modulate the geometry of the plane, deforming it even in more than one deformation zone.

To this end, the work surface 2 can comprise a plurality of deformation zones and the handling device consequently comprises a corresponding plurality of actuators 3 coupled to respective deformation zones.

In other words, there is a unique coupling between the actuator 3 and the deformation zone so that each actuator 3 is capable of acting locally to deform only the deformation zone coupled thereto.

Preferably, the entire work surface 2 is divided into a plurality of deformation zones, which are therefore adjacent to each other and arranged, for example, according to a matrix profile.

In other words, the work surface 2 is overall composed and defined by a plurality of adjacent deformation zones so as to allow the entire topology thereof to be modified in every position and in the most continuous manner possible.

Advantageously, the actuators 3 can be selectively, autonomously and independently operated.

It is thereby possible to precisely and accurately manage the shape assumed by the work surface 2 since the deformations thereof are generated in the individual deformation portions.

This does not alter the fact that the actuators 3 are also controllable in separate groups so as to apply the same deformation or type of deformation at different points of the work surface 2.

As an example, if the surface is to be made to assume a concave or convex overall shape, the actuators 3 can be operated so that those closest to the centre exert a certain pushing/pulling action which is also replicated by all the other actuators 3 but with a lower intensity in a concentric manner moving towards the edge of the work surface 2.

In accordance with a possible aspect of the present invention, the work surface 2 comprises and is defined by a plurality of discrete elements (4) each of which defines a respective deformation portion and is therefore coupled to a respective actuator 3.

Each of these discrete elements (4), thus each of the deformation portions, can have a tapered shape in particular according to a cone or pyramid profile, where the base contributes to define the second face 2*b* of the work surface 2 and is coupled to the respective actuator 3, while the reduced-size portion contributes to define the first face 2*a*.

Thereby, each actuator 3 has a sufficient coupling zone with the discrete element defining the respective deformation portion while reducing the contact surface between the first face 2*a* and the first layer of the object to be made, thus facilitating in particular the detachment thereof at the end of the production process.

In accordance with a possible embodiment, the handling device is further configured to tilt the entire work surface 2 with respect to a horizontal plane. In other words, the handling device is operable so as to change the overall spatial orientation of the work surface, so as to allow the inclination thereof to be varied, for example with respect to an extrusion head T which is depositing material on its first face 2*a*.

In particular, the handling device can comprise a plurality of orientation actuators 3 coupled to respective coupling points of the work surface 2*a* coinciding with its vertices, or more generally with peripheral/perimeter positions of the work surface 2*a*, and configured to move such coupling points.

For example, the orientation actuators 3 can be linear actuators 3 leveraged to the coupling points and selectively and independently activated so that the respective movements cause the progressive lifting/lowering of the coupling points and therefore the tilting of the work surface 2.

The plane 1 can further comprise an optical sensor, preferably a thermal camera or a TLC-type camera with light polarization (thus defining a camera-polarizer system), configured to acquire images of the object during the execution of the additive manufacturing process.

It is thereby possible to verify, while making the object, the occurrence of any unwanted stress within its structure.

To actively compensate for such a phenomenon, the plane 1 further comprises a control unit configured to determine the tension stress of the object as a function of the acquired images and to activate the handling device as a function of said tension stress so as to minimize it.

In other words, the control unit determines the presence of undesired tension stresses by analysing the images acquired by the optical sensor and activating the actuators 3 to deform the work surface 2 until the identified tension stresses are reduced as much as possible.

In order to further optimize the execution of the additive manufacturing process, improving the overall quality of the object to be made (in particular from the point of view of its mechanical properties), the plane 1 can further comprise a thermoregulator device configured to regulate a temperature of the work surface 2.

In particular, the thermoregulator device is facing the second face 2*b* so as to be able to act on the work surface 2 without the interference of the object which is progressively made on the first face 2*a*.

Such a thermoregulation activity makes it possible to ensure that the work surface has an optimal temperature for the execution of the additive manufacturing process at all times, in particular during the creation of the first layer of the object to be produced, as well as to particularly precisely and accurately control the cooling thereof so as to avoid overly rapid cooling which could compromise the structural integrity thereof.

Structurally, the thermoregulator device can comprise at least one heat emitter associated with at least a respective area of the work surface 2 and capable of locally regulating the specific temperature of said respective area.

In other words, the thermoregulator device can comprise one or more emitters capable of heating specific areas within the work surface 2, thereby allowing the temperature assumed by said work surface 2 to be selectively varied at every point thereof.

By way of non-limiting example, the at least one heat emitter can comprise at least one of an ultrasonic emitter, a microwave emitter, an infrared emitter.

In accordance with a possible embodiment, the entire work surface 2 is divided into a plurality of distinct (preferably contiguous) areas and the thermoregulator device comprises a plurality of heat emitters where each heat emitter is uniquely coupled to a respective area and is selectively activatable to locally regulate the temperature thereof.

In other words, each individual heat emitter can be selectively activated if it is necessary to change the temperature of the specific area to which it is uniquely associated.

In this context, the heat emitters can be arranged according to a matrix pattern in which each emitter is facing the respective area.

Alternatively, in accordance with a possible further embodiment, the at least one heat emitter is movable, preferably parallel to the work surface, between a plurality of distinct positions in which it appears to be facing and thus associated with a respective plurality of distinct areas to locally regulate the temperature of such distinct areas.

In other words, the thermoregulator device can comprise one or more movable heat emitters so as to be moved according to the needs at the specific area of the work surface 2 to be heated at a given time.

For example, a heat emitter could be moved along the same trajectory along which the first layer of the object to be made is deposited so as to heat the work surface 2 before or immediately before the material is deposited on such a surface.

Alternatively, the thermoregulator device can further comprise one or more fixed emitters and one or more movable emitters.

In a similar manner, the plane 1 can further comprise a heating device designed to regulate the temperature of the material deposited and/or just deposited on the work surface.

Thus, overall, the thermoregulator device makes it possible to control the temperature of the work surface 2, while the heating device acts on the material during the creation of the object on said surface.

In particular, the heating device is facing the first face 2*a* of the work surface 2, so as to be facing the material while it is deposited.

In a manner similar to the thermoregulator device, the heating device can also comprise one or more heat emitters, made both from a structural and functional point of view in a manner similar to that outlined above. Advantageously, the present invention achieves the proposed objects by overcoming the drawbacks complained of in the prior art, providing the user with a deposition plane for additive manufacturing processes which can be adapted and modified topologically according to the specific features of the object to be made, so as to ensure the structural integrity thereof.

The object of the present invention is also a plant for additive manufacturing processes.

Such a plant essentially comprises a deposition plane 1 and an extrusion head T.

In particular, the deposition plane 1 is made as described above and the extrusion head T is configured to deposit on such a plane 1 a material to be extruded according to a succession of superimposed layers.

In this context, the heating device, if present, can comprise one or more heat emitters integrated or coupled to the extrusion head T, so that they can be moved together with the latter during the manufacture of the object, always remaining as close as possible to the material being deposited or which has just been deposited.

In particular, the heat emitters can be implemented so as to act on one or more points of a layer of material already deposited immediately before further material is deposited thereon.

The invention claimed is:

1. Deposition plane for additive manufacturing processes comprising:

a work surface (2) topologically deformable in at least one deformation zone and having a first face (2*a*) on which an object can be formed; and a handling device comprising a plurality of actuators (3) coupled to a second face (2*b*) of said work surface (2) at the at least one deformation zone and configured to locally deform said work surface (2) by moving the deformation zone, by exerting a pulling or pushing action on said deformation zone, wherein:

the work surface (2) comprises a plurality of deformation points, each actuator (3) being coupled to and configured to move a respective deformation zone;

the entire work surface (2) is divided into a plurality of deformation zones, arranged according to a matrix profile, and at least one actuator (3) is selectively activatable independently from at least another further actuator (3) of said plurality of actuators (3); and the work surface comprises a plurality of discrete elements (4) having a substantially cone or pyramid shape having a concurrent base to define the second face (2*b*) of the work surface (2), each discrete element (4) being adapted to define a respective deformation zone;

and wherein:

the plane further comprises a thermoregulator device facing the second face (2*b*) of the work surface and configured to regulate a temperature of the work surface (2), said thermoregulator device comprising a plurality of heat emitters associated with at least one respective area of the work surface (2) and adapted to locally regulate a temperature of the respective area;

the entire work surface (2) is divided into a plurality of distinct areas and wherein each heat emitter is uniquely coupled to a respective area and selectively activatable to locally regulate the temperature of said respective area; and the plurality of heat emitters are movable, parallel to the work surface (2), between a plurality of distinct positions in which the heat emitter is associated with a respective plurality of distinct areas to locally regulate the temperature of said distinct areas.

2. The plane according to claim 1, wherein the first face (2*a*) has a corrugated shape adapted to reduce in use the contact surface between the first face (2*a*) and the object.

3. The plane according to claim 1, wherein the actuator (3) comprises a linear actuator (3).

4. The plane according to claim 1, wherein the handling device is configured to tilt the entire work surface (2) with respect to a horizontal plane, said handling device comprising a plurality of orientation actuators (3) coupled to respective vertices of said work surface (2) and configured to move said vertices independently.

5. The plane according to claim 1, wherein the plurality of heat emitter comprises at least one of an ultrasonic emitter or a microwave emitter or an infrared emitter.

6. The plane according to claim 1, comprising a heating device facing the first face (2*a*) of the work surface (2) and configured to regulate a temperature of a material deposited and/or just deposited on said work surface (2).

7. An additive manufacturing apparatus comprising:

a deposition plane according to claim 1; and an extrusion head (T) configured to deposit a material to be extruded on said deposition plane.

8. Deposition plane for additive manufacturing processes comprising:

a work surface (2) topologically deformable in at least a deformation zone and having a first face (2*a*) on which an object can be formed; and a handling device comprising a plurality of actuators (3) coupled to a second face (2*b*) of said work surface (2) at the deformation zone and configured to locally deform said work surface (2) by moving the deformation zone, by exerting a pulling or pushing action on said deformation zone, wherein:

the work surface (2) comprises a plurality of deformation points and each actuator (3) being coupled to and configured to move a respective deformation zone;

the entire work surface (2) is divided into a plurality of deformation zones, arranged according to a matrix profile, and at least an actuator (3) is selectively activatable independently from at least an further actuator (3) of said plurality of actuators (3); and the work surface comprises a plurality of discrete elements (4) having a substantially cone or pyramid shape having a concurrent base to define the second face (2*b*) of the work surface (2), each discrete element (4) being adapted to define a respective deformation zone;

wherein the plane further comprises:

an optical sensor, comprising a thermal camera, configured to acquire images of the object during the execution of an additive manufacturing process; and a control unit configured to determine a tension stress of said object according to the images acquired by the optical sensor and to activate the handling device according to said tension stress, so as to minimize said tension stress.

9. An additive manufacturing apparatus comprising:

a deposition plane according to claim 8; and an extrusion head (T) configured to deposit a material to be extruded on said deposition plane.

* * * * *